United States Patent
Park

(10) Patent No.: US 9,278,359 B2
(45) Date of Patent: Mar. 8, 2016

(54) ENERGY RECYCLING TYPE DUST REMOVING PROCESSING SYSTEM FOR REMOVING CONTAIMINATED MATERIAL IN HIGH TEMPERATURE CONTAMINATED GAS AND INERTIAL IMPACT TYPE ENERGY RECOVERING AND DUST REMOVING APPARATUS

(75) Inventor: Seong-Kyu Park, Seoul (KR)

(73) Assignee: KF E&E CO., LTD., Seoul (KR)

( * ) Notice: Subject to any disclaimer, the term of this patent is extended or adjusted under 35 U.S.C. 154(b) by 617 days.

(21) Appl. No.: 13/588,475

(22) Filed: Aug. 17, 2012

(65) Prior Publication Data
US 2013/0149203 A1 Jun. 13, 2013

(30) Foreign Application Priority Data

Dec. 8, 2011 (KR) .......... 10-2011-0131267
Feb. 28, 2012 (KR) .......... 10-2012-0020072

(51) Int. Cl.
| | |
|---|---|
| *B01D 50/00* | (2006.01) |
| *B03C 3/017* | (2006.01) |
| *B01D 45/08* | (2006.01) |
| *B01D 45/16* | (2006.01) |
| *B01D 45/12* | (2006.01) |
| *B01D 46/24* | (2006.01) |
| *B01D 45/04* | (2006.01) |
| *F24D 11/00* | (2006.01) |

(52) U.S. Cl.
CPC ............ *B03C 3/017* (2013.01); *B01D 45/08* (2013.01); *B01D 45/12* (2013.01); *B01D 45/16* (2013.01); *B01D 46/2411* (2013.01); *B01D 50/002* (2013.01); *B01D 45/04* (2013.01); *F24D 11/007* (2013.01); *F24D 11/008* (2013.01)

(58) Field of Classification Search
CPC ...... B01D 50/002; B01D 45/08; B01D 45/16; B01D 45/12; B01D 46/2411
USPC .......... 55/440–446, 320–325, 334–340, 361, 55/462, 459.1, 447
See application file for complete search history.

(56) References Cited

U.S. PATENT DOCUMENTS

| | | | | |
|---|---|---|---|---|
| 1,519,428 | A | * | 12/1924 | Wilisch .......................... 96/299 |
| 1,632,325 | A | * | 6/1927 | Anderson ...................... 55/446 |
| 1,926,262 | A | * | 9/1933 | Campbell ...................... 55/324 |
| 2,599,139 | A | * | 6/1952 | Stevenson ..................... 96/230 |
| 2,873,816 | A | * | 2/1959 | Umbricht et al. ............... 96/265 |
| 2,903,087 | A | * | 9/1959 | Glasgow ......................... 96/177 |
| 2,925,144 | A | * | 2/1960 | Kroll .............................. 55/296 |

(Continued)

*Primary Examiner* — Dung H Bui
(74) *Attorney, Agent, or Firm* — Davis & Bujold PLLC; Michael J. Bujold

(57) ABSTRACT

An energy recycling type dust removing processing system for removing a contaminated material in high temperature contaminated gas and an inertial impact type energy recovery and dust removal apparatus. The energy recycling type dust removing processing system includes: a duct collecting a high temperature contaminated gas including high temperature dust; an energy recovery and inertial impact type dust removal unit recovering energy of the high temperature contaminated gas to convert the high temperature contaminated gas into a middle temperature contaminated gas and removing coarse dust from the high temperature dust through an inertial impact phenomenon; an in-flight adsorption apparatus removing fine dust from the contaminated gas in which the coarse dust is removed; and a micro dust removal apparatus removing micro dust in the contaminated air from which the fine dust is removed by the in-flight adsorption apparatus.

17 Claims, 13 Drawing Sheets

(56) References Cited

U.S. PATENT DOCUMENTS

| | | | |
|---|---|---|---|
| 3,060,664 A * | 10/1962 | Morawski | 55/431 |
| 3,065,587 A * | 11/1962 | Fordyce et al. | 55/442 |
| 3,315,445 A * | 4/1967 | De Seversky | 96/53 |
| 3,443,364 A * | 5/1969 | Saltsman | 96/313 |
| 3,444,669 A * | 5/1969 | Umbricht et al. | 96/284 |
| 3,527,030 A * | 9/1970 | Hungate | 55/440 |
| 3,834,135 A * | 9/1974 | Jordan | 55/444 |
| 3,880,624 A * | 4/1975 | Arnold et al. | 96/228 |
| 4,011,157 A * | 3/1977 | Pennebaker et al. | 210/718 |
| 4,229,189 A * | 10/1980 | Pircon | 95/214 |
| 4,557,740 A * | 12/1985 | Smith | 55/440 |
| 5,078,760 A * | 1/1992 | Haldipur et al. | 95/268 |
| 5,211,729 A * | 5/1993 | Sherman | 55/308 |
| 6,454,824 B1 * | 9/2002 | Maryamchik et al. | 55/434.4 |
| 7,252,807 B2 * | 8/2007 | Hopkins | 422/168 |
| 7,329,295 B2 * | 2/2008 | Greene et al. | 55/337 |
| 7,604,676 B2 * | 10/2009 | Braziunas | 55/385.3 |
| 8,657,910 B2 * | 2/2014 | Park et al. | 55/419 |
| 8,852,307 B2 * | 10/2014 | Sikkenga et al. | 55/434.2 |
| 2010/0018173 A1 * | 1/2010 | Park et al. | 55/323 |
| 2010/0139033 A1 * | 6/2010 | Makarov et al. | 15/353 |
| 2011/0016663 A1 * | 1/2011 | Horne | 15/347 |
| 2011/0225764 A1 * | 9/2011 | Muhlenkamp et al. | 15/347 |

* cited by examiner

ENERGY RECYCLING TYPE DUST REMOVING PROCESSING SYSTEM FOR REMOVING CONTAIMINATED MATERIAL IN HIGH TEMPERATURE CONTAMINATED GAS AND INERTIAL IMPACT TYPE ENERGY RECOVERING AND DUST REMOVING APPARATUS

CROSS REFERENCE TO RELATED APPLICATION

This application claims the benefit of Korean Patent Application No. 10-2011-0131267 and 10-2012-0020072, filed on, Dec. 8, 2011 and Feb. 28, 2012, respectively which are hereby incorporated by reference in their entirety into this application.

BACKGROUND OF THE INVENTION

1. Technical Field

The present invention relates to an energy recycling type dust removing processing system for removing contaminated material in high temperature contaminated gas by recovering energy and simultaneously processing a particulate air contaminated material, a gaseous air contaminated material, and an offensive odor material in a process of processing high temperature exhaust gas containing high viscosity oil droplets and fine dust, and an inertial impact type energy recovery and dust removal apparatus.

2. Description of the Related Art

Generally, as technologies for processing the exhaust gas generated in various industrial fields and including an air contaminated material, a technology for processing a particulate air contaminated material, an electrostatic precipitator, a filter dust collector, or the like, has been used. Furthermore, a technology for processing a gaseous air contaminated material, an absorption method, an adsorption method, a catalytic oxidizer, or the like, has been used. However, in the case of processing the exhaust gas containing a large amount of high viscosity oil droplets, fine dust, and a gaseous air contaminated material, at the time of applying a general processing technology, the processing efficiency decreases and the maintenance cost increases.

Particularly, at the time of using a general processing apparatus as an apparatus for processing the exhaust gas generated at the time of biomass burning and containing fine dust and oil droplet including a large amount of pyroligneous liquor generated in carbonization process, such as a charcoal kiln for charcoal production or a charcoal kiln for fomentation, processing efficiency decreases and processing costs increase. The reason that the processing efficiency decreases and the processing costs increase is that the high viscosity oil droplets adhere to a surface of the electrostatic precipitator, such that it is not easily separated or the high viscosity oil droplets close filtering pores of a filter cloth of the filter dust collector to increase differential pressure, such that it is not processed or separated, whereby the electrostatic precipitator or the filter dust collector should be replaced.

In addition, at the time of use of a general air contaminated material processing apparatus as an apparatus for processing the exhaust gas containing oil droplets generated in a process of roasting meat and fine dust or an apparatus for processing oil vapor and exhaust gas generated in a drying process, or the like, of a food processing factory and containing high viscosity and high temperature oil droplet and fine dust, it is difficult to process the exhaust gas containing the oil droplets generated in a process of roasting meat and the fine dust and the oil vapor and the exhaust gas containing the high temperature oil droplets and the fine dust. Further, even in an apparatus for processing the exhaust gas discharged from an industrial facility and containing a large amount oil droplets and oil vapor, an improved processing technology has been demanded.

In order to solve these problems, various processing systems for removing high viscosity oil droplets and fine dust in the exhaust gas of a kiln for charcoal production and a charcoal kiln for fomentation, the exhaust gas of a meat roasting restaurant, the oil vapor generated in a drying process of a food processing factory, and the exhaust gas generated in an industrial facility and containing high viscosity oil droplets and fine dust have been developed, and a technology for improving dust removing efficiency and recovering and recycling energy from high temperature exhaust gas has been required.

SUMMARY OF THE INVENTION

An object of the present document is to provide an energy recovery type dust processing system for recovering energy and simultaneously processing a particulate air contaminated material, gaseous air contaminated material, and an offensive odor material in a process of processing high temperature exhaust gas containing high viscosity oil droplet and fine dust in exhaust gas of a kiln for charcoal production and a charcoal kiln for fomentation, exhaust gas of a meat roasting restaurant, oil vapor generated in a drying process of a food processing factory, and exhaust gas generated in an industrial facility and containing high viscosity oil droplets and fine dust.

According an exemplary embodiment of the present document, there is provided an energy recycling type dust removing processing system for removing a contaminated material in high temperature contaminated gas, the energy recycling type dust removing processing system including: a collecting duct collecting a high temperature contaminated gas including a high temperature dust; an energy recovery and inertial impact type dust removal unit recovering an energy of the high temperature contaminated gas to convert the high temperature contaminated gas into a middle-low temperature contaminated gas and removing a coarse dust in the high temperature dust through an inertial impact phenomenon; an in-flight adsorption apparatus removing fine dust in the contaminated gas in which the coarse dust is removed; and a micro dust removal apparatus removing micro dust in the contaminated air from which the fine dust is removed by the in-flight adsorption apparatus.

The micro dust removal apparatus may include at least one of a middle performance high temperature type adsorption filter, an electrostatic precipitator (ESP), a bag filter dust collector, and an electrostatic cyclone.

The energy recycling type dust removal processing system may further include an energy recycling system for recycling energy obtained from the energy recovery and inertial impact type dust removal unit.

The energy recycling system may include: a hot water tank that accommodates hot water supplied from the energy recovery and inertial impact type dust removal unit therein; and an auxiliary energy unit supplying energy to the hot water tank.

The in-flight adsorption apparatus may include: a chamber connected to the inertial impact type dust removal apparatus; and a cyclone dust collecting apparatus connected to the chamber.

The chamber may include: a housing including a first duct and a second duct; a plurality of partition walls installed at an angle on inner walls of the housing to form a zigzag channel; and an adsorbent discharging unit installed in the housing to discharge an adsorbent to the channel.

The first duct may be a duct through which the high temperature contaminated gas is introduced and the second duct may be a duct discharging cleaned air from which the high temperature contaminated dust is removed.

The plurality of partition walls may be attached to sidewalls of the housing and be installed to be inclined at a downward acute angle with respect to a horizontal direction.

The plurality of partition walls may have an arc shaped cross-section.

The chamber may further include an impact apparatus applying impact to the housing in order to remove the contaminated material collected on the planes of the partition walls.

The impact apparatus may include an eccentric motor.

The plurality of partition walls may be alternately attached to a bottom surface and a ceiling surface of the housing to form the zigzag channel.

The energy recycling type dust removing processing system may further include a pyroligneous liquor recovering which can connected to the energy recovery and inertial impact type dust removal unit to condense dry distillation gas generated at the time of producing charcoal, thereby recovering pyroligneous liquor, wherein the dry distillation gas corresponds to the high temperature contaminated gas.

The energy recycling type dust removing processing system may further include an unburned material reburning apparatus installed at the rear end of the collecting duct to burn and remove micro dust that is not removed in the micro dust removal apparatus.

The energy recycling type dust removing processing system may further include an open damper to control the flow rate of the contaminated gas supplied to the micro dust removal apparatus constant.

The energy recycling type dust removing processing system may further include a self flow rate controlling blowing apparatus configured to open the open damper.

According to another exemplary embodiment of the present document, there is provided an inertial impact type energy recovery and dust removal assembly including: a first blade inclined with respect to a flow of a high temperature contaminated gas by a predetermined angle to thereby be inclined with respect to a direction of a wind of the high temperature contaminated gas by a predetermined angle; a second blade extended from the first blade while having a bending angle; and a heat pipe formed at a connection point between the first blade and the second blade, wherein cold water introduced into the heat pipes is converted into hot water by heat that is transferred by the heat pipe into hot water and then discharged.

The inertial impact type energy recovery and dust removal assembly may further include a pair of first blocking blades installed at the connection point between the first blade and the second blade and having an arc shaped cross section.

The inertial impact type energy recovery and dust removal assembly may further include a second blocking blade installed at a rear end portion of the second blade and having an arc shaped cross section.

The inertial impact type energy recovery and dust removal assembly may comprises a first inertial impact apparatus installed at the front end, a second inertial impact apparatus installed at the rear end, a plurality of heat pipes 31 installed between the first inertial impact apparatus and the second inertial impact apparatus, and a fan for cooling off the heat pipes.

This present invention is supported by Korea Ministry of Environment as "The Eco-Innovation 21 project(401-112-018)

BRIEF DESCRIPTION OF THE DRAWINGS

The above and other objects, features and advantages of the present document will be more clearly understood from the following detailed description taken in conjunction with the accompanying drawings, in which.

DESCRIPTION OF THE PREFERRED EMBODIMENTS

Hereinafter, an energy recycling type dust removing processing system for removing a contaminated material from high temperature contaminated gas and an inertial impact type energy recovery and dust removal apparatus according to an exemplary embodiment of the present document will be described in more detail with reference to the accompanying drawings. Terms "apparatus", "units", "assembly", and "part" for components used in the following description are used only in order to easily make a specification. Therefore, the above-mentioned terms do not have meanings or roles that distinguish from each other in themselves.

Furthermore, This present invention is supported by Korea Ministry of Environment as "The Eco-Innovation 21 project (401-112-018)"

Figure 1A:
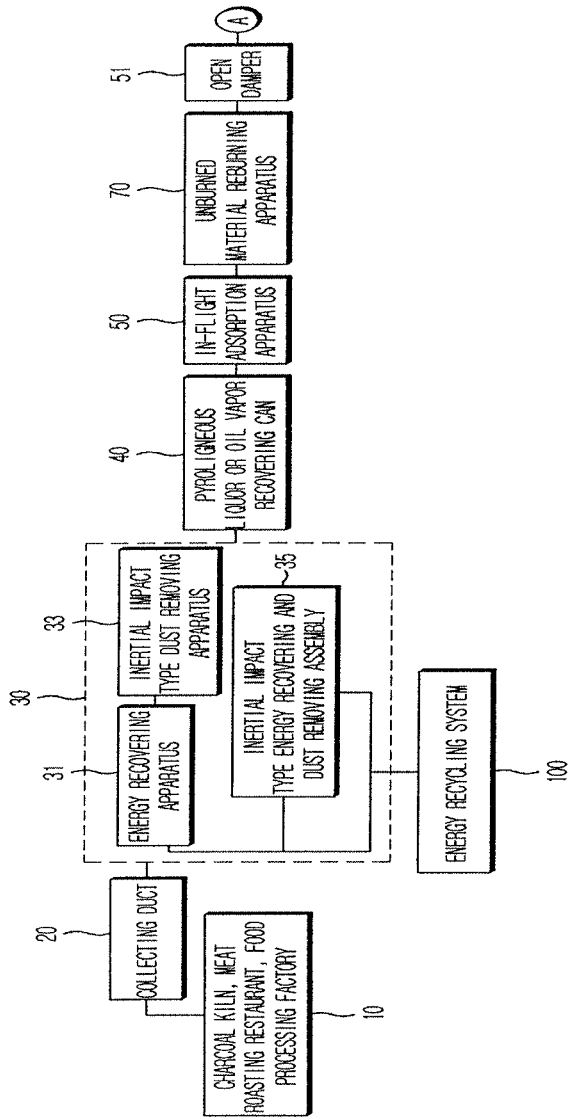
FIGS. 1A and 1B are block diagrams showing a configuration of an energy recycling type dust removing processing system for removing a contaminated material in high temperature contaminated gas according to an exemplary embodiment of the present document.
Figure 1B:
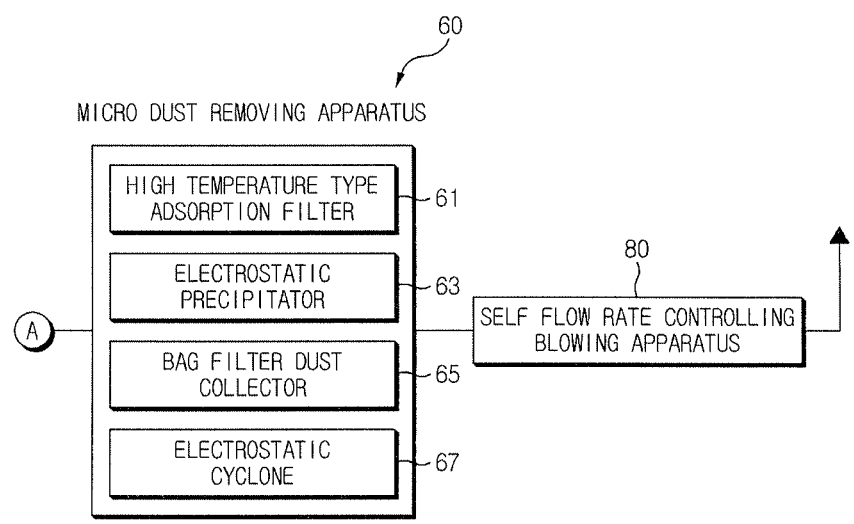

FIGS. 1A and 1B are block diagrams showing a configuration of an energy recycling type dust removing processing system for removing a contaminated material from high temperature contaminated gas according to an exemplary embodiment of the present document. As shown in FIGS. 1A and 1B, the energy recycling type dust removing processing system for removing a contaminated material from high temperature contaminated gas according to the exemplary embodiment of the present document may be configured to include a collecting duct 20 for collecting a high temperature contaminated gas generated from a high temperature contamination generation source 10 (a charcoal kiln, a meat roasting restaurant, a food processing factory, or the like) and including high temperature dust; an energy recovery and inertial impact type dust removal unit 30 including an energy recovery apparatus 31, an inertial impact type dust removal apparatus 33, and an inertial impact type energy recovery and dust removal assembly 35; a pyroligneous liquor or oil vapor recovering can 40; an in-flight adsorption apparatus 50; an open damper 51; a micro dust removal apparatus 60; an unburned material reburning apparatus 70; and a self flow rate controlling blowing apparatus 80.

Here, the high temperature contamination generation source 10 means a contamination generation source discharging a high temperature gas, such as the charcoal kiln for producing charcoal, the meat roasting restaurant, an incineration plant, or the like.

The collecting duct 20 serves to collect the high temperature contaminated gas generated in the high temperature contamination source 10 and including the high temperature dust. As described above, the high temperature contaminated gas collected in the collecting duct 20 is moved to the energy recovery and inertial impact type dust removal unit 30.

The energy recovery and inertial impact type dust removal unit 30 serves to recover the energy of the high temperature contaminated gas to convert the high temperature contaminated gas into middle-low temperature contaminated gas (changes cold water into hot water heat generated at this time) and remove coarse dust in the contaminated gas. The energy recovery and inertial impact type dust removal unit 30 may include the energy recovery apparatus 31, the inertial impact type dust removal apparatus 33, and the inertial impact type energy recovery and dust removal assembly 35 (an integral type). An example of the energy recovery apparatus 31 will be described with reference to FIG. 3, and an example of the inertial impact type energy recovery and dust removal assembly 35 will be described with reference to FIGS. 4A and 4B.

The energy obtained from the energy recovery and inertial impact type dust removal unit 30 is recycled in an energy recycling system 100. The energy recycling system 100 will be described with reference to FIG. 2.

The in-flight adsorption apparatus 50 serves to remove fine dust in the contaminated gas in which the coarse dust is removed in the energy recovery and inertial impact type dust removal unit 30 and may include a cyclone apparatus and a chamber 300. The cyclone apparatus, which is an apparatus that removes dust using centrifugal force, moves particulate matter (dust) in a fluid introduced in a tangent line of a cylindrical housing to a wall surface by the centrifugal force and allows the dust moved to the wall surface to drop downward and be collected in a hopper, thereby removing the fine dust. Meanwhile, the chamber will be described in more detail with reference to FIGS. 5 to 9.

When an air inlet is closed in order to block the supply of oxygen in a carbonization process such as in a charcoal kiln, a generated flow rate becomes small. Therefore, in order to supply a constant flow rate to a subsequent processing apparatus, the open damper 51 is opened to supply a constant flow rate to a subsequent processing apparatus. That is, a processed flow rate of the micro dust removal apparatus 60 is allowed to be constant, such that a processing speed is maintained to be constant, thereby increasing the processing efficiency of the micro dust removal apparatus 60.

The micro dust removal apparatus 60 serves to remove micro dust in the contaminated air from which the fine dust is removed by the chamber 300. As the micro dust removal apparatus 60, at least one of a middle performance high temperature type adsorption filter 61, an electrostatic precipitator (ESP) 63, a bag filter dust collector 65, and an electrostatic cyclone 67 may be used.

The unburned material reburning apparatus 70 includes a sensor configured to sense carbon monoxide (CO), hydrocarbon (HC), or the like, which is a combustible material. Therefore, the unburned material reburning apparatus 70 ignites and burns CO or HC using auxiliary fuel when it is sensed that the concentration of CO or HC is at or above a predetermined level, thereby converting CO or HC into carbon dioxide or water which is a harmless material. The unburned material reburning apparatus 70 may be installed at the front end of the open damper 51 in the case that the pyroligneous liquor is recovered or be installed between the collecting duct 20 and the energy recovery and inertial impact type dust removal unit 30 in the case that the pyroligneous liquor is not recovered.

The self flow rate controlling blowing apparatus 80 opens the open damper 51 if the introduced flow rate is low, in order to maintain a constant flow rate and sustain the efficiency of the micro dust removal apparatus 60.

Next, a configuration of the energy recycling system 100 will be described in more detail with reference to FIG. 2.

Figure 2:
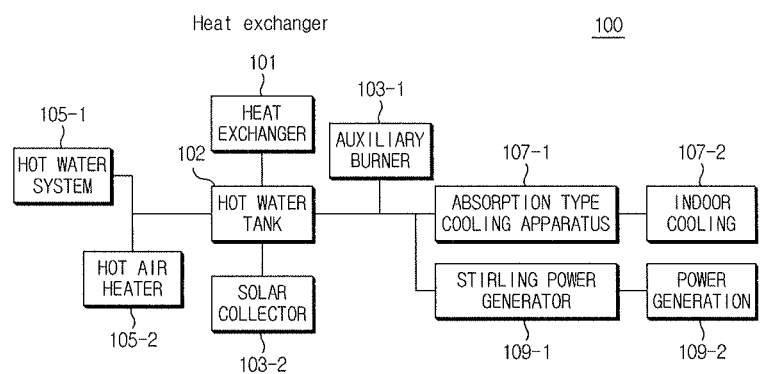
FIG. 2 is a block diagram of an energy recycling system included in the energy recycling type dust removing processing system for removing a contaminated material in high temperature contaminated gas according to the exemplary embodiment of the present document.

FIG. 2 is a block diagram of an energy recycling system included in the energy recycling type dust removing processing system for removing a contaminated material in high temperature contaminated gas according to the exemplary embodiment of the present document.

As shown in FIG. 2, the energy recycling system 100 may include a hot water tank 102 for storing hot water discharged from the energy recovery and inertial impact type dust removal unit 30 therein, an auxiliary burner 103-1 and a solar collector 103-2, which are auxiliary energy units for heating the hot water tank, an absorption type cooling apparatus 107-1 performing a cooling function using the hot water of the hot water tank 102, a stirling power generator 109-1 generating power using the hot water of the hot water tank 102, a hot air heater 105-1 performing a hot air heating function using the hot water of the hot water tank 102, and a heating system 105-2 using the hot water.

Indoor cooling 107-2 may be performed by the absorption type cooling apparatus 107-1, and power generation 109-2 may be performed by the stirling power generator 109-1.

Next, structures of the energy recovery apparatus (a heat pipe) 31, the inertial impact type dust removal apparatus 33, the inertial impact type energy recovery and dust removal assembly 35, and the chamber included in the energy recovery and inertial impact type dust removal unit 30 are used in the energy recycling type dust removing processing system for removing a contaminated material from high temperature contaminated gas and will be described in more detail with reference to FIGS. 3A to 9.

Figure 3A:
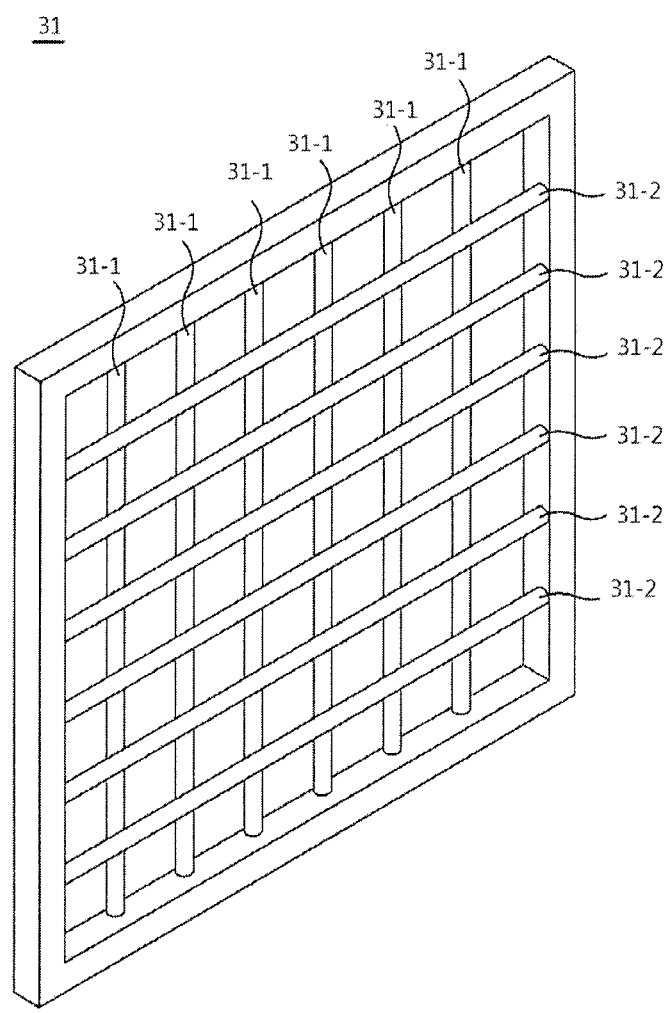
FIG. 3A is a diagram showing an example of a heat pipe used in the energy recycling type dust removing processing system for removing a contaminated material in high temperature contaminated gas according to the exemplary embodiment of the present document.

FIG. 3A is a diagram showing an example of a heat pipe (an energy recovery apparatus) used in the energy recycling type dust removing processing system for removing a contaminated material from high temperature contaminated gas according to the exemplary embodiment of the present document. As shown in FIG. 3A, the heat pipe 31 may include a plurality of first heat pipes 31-1 arranged in a first direction in a frame and a plurality of second heat pipes 31-2 arranged in a second direction perpendicular to the first direction. The high temperature contaminated gas that is generated in the contamination generation source 10 passes between the first and second heat pipes 31-1 and 31-2, such that heat of the high temperature contaminated gas is conducted to the first and second heat pipes. Therefore, temperatures of the first and second heat pipes 31-1 and 31-2 rise, such that the high temperature contaminated gas is converted into middle-low temperature contaminated gas. The cold water introduced into an upper or horizontal separation can is converted into hot water by the heat conducted to the heat pipe 31.

The energy recovery and inertial impact type dust removal unit in which the heat pipe shown in FIG. 3A is used will be described with reference to FIG. 3B.

Figure 3B:
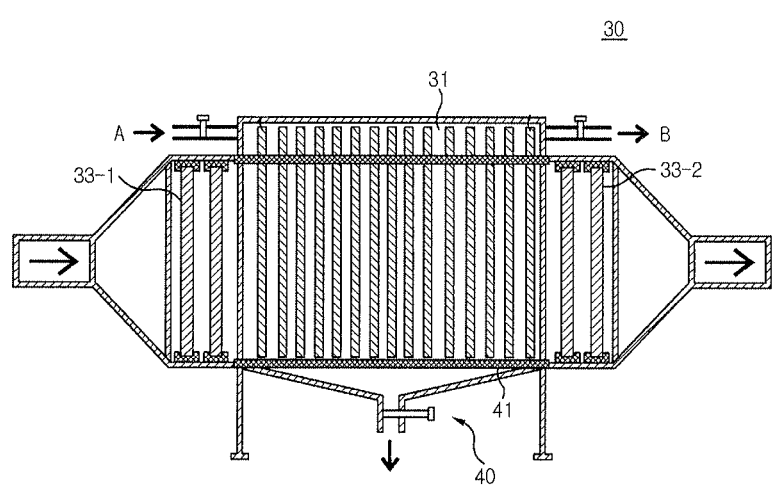
FIG. 3B is a diagram describing an energy recovery and inertial impact type dust removal unit in which the heat pipe of FIG. 3A is installed.

As shown in FIG. 3B, the energy recovery and inertial impact type dust removal unit 30 may include a first inertial impact apparatus 33-1 installed at the front end, a second inertial impact apparatus 33-2 installed at the rear end, and a plurality of heat pipes 31 installed at a central portion.

The first inertial impact apparatus 33-1 serves to remove the coarse dust in the high temperature exhaust gas that is collected in and introduced from the collecting duct 20 at the front end by an inertial impact phenomenon.

The temperature of the plurality of heat pipes 31 increases due to the heat of the high temperature exhaust gas, as described above with reference to FIG. 3A. In this case, the temperature of water flowing (from A to B) through a waterway disposed at an upper portion of the energy recovery and inertial impact type dust removal unit 30 rises, such that the cold water is converted into hot water and then discharged.

Meanwhile, the second inertial impact apparatus 33-2, which has the same form as the first inertial impact apparatus 33-1, is installed at the rear end of the plurality of heat pipes 31 to remove the coarse dust once again, thereby making it possible to increase a dust removal rate.

In addition, as shown in FIG. 3B, a porous plate 41 for recovering the pyroligneous liquor is installed at a lower end portion, and the pyroligneous liquor passing through the porous plate 41 is recovered by the recovering can (not shown) installed at the lower end portion.

Next, the energy recovery and inertial impact type dust removal unit using the inertial impact type energy recovery and dust removal assembly 35, which is used in the energy recycling type dust removing processing system for removing a contaminated material in high temperature contaminated gas according to the exemplary embodiment of the present document, will be described in detail with reference to FIGS. 4A and 4B.

Figure 4A:
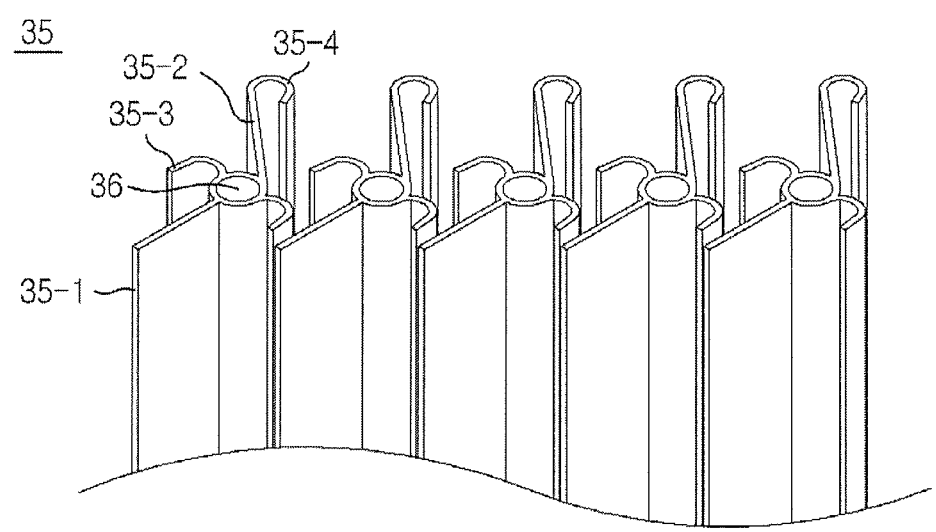
FIG. 4A is a diagram showing an example of an inertial impact type energy recovery and dust removal assembly used in the energy recycling type dust removing processing system for removing a contaminated material in high temperature contaminated gas according to the exemplary embodiment of the present document.
Figure 4B:
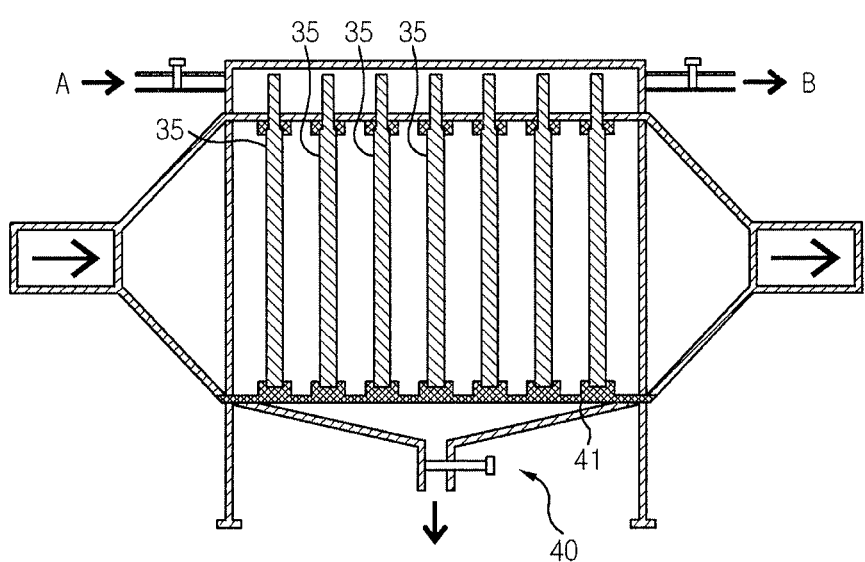
FIG. 4B is a diagram describing an energy recovery and inertial impact type dust removal unit in which the inertial impact type energy recovery and dust removal assembly of FIG. 4A is used.

FIG. 4A is a diagram showing an example of an inertial impact type energy recovery and dust removal assembly used in the energy recycling type dust removing processing system for removing a contaminated material in high temperature contaminated gas according to the exemplary embodiment of the present document.

As shown in FIG. 4A, the inertial impact type energy recovery and dust removal assembly 35 (an integral type) may include a first blade 35-1 inclined with respect to a flow of the high temperature contaminated gas by a predetermined angle to thereby be inclined with respect to a direction of a flow of the high temperature contaminated gas by a predetermined angle, a second blade 35-2 extended from the first blade 35-1 while having a bending angle, and a heat pipe 36 that is formed at a connection point between the first and second blades 35-1 and 35-2. The cold water may be converted into the hot water by the heat pipe 36 and then discharged.

Meanwhile, a pair of first blocking blades 35-3 is installed at the connection point between the first and second blades 35-1 and 35-2. The dust impacts the pair of first blocking blades 35-3, such that it is removed by gravity.

In addition, a second blocking blade 35-4 is installed at a rear end portion of the second blade 35-2 to further remove dust once again.

The inertial impact type energy recovery and dust removal assembly manufactured as described above may simultaneously remove dust and the recycle energy.

The energy recovery and inertial impact type dust removal unit 30 in which the inertial impact type energy recovery and dust removal assembly of FIG. 4A is used will be described with reference to FIG. 4B. The energy recovery and inertial impact type dust removal unit 30 shown in FIG. 4B has substantially the same configuration as that of the energy recovery and inertial impact type dust removal unit shown in FIG. 3B. Therefore, a description thereof will be omitted. Unlike the energy recovery and inertial impact type dust removal unit shown in FIG. 3B, in the energy recovery and inertial impact type dust removal unit shown in FIG. 4B, the inertial impact type energy recovery and dust removal assembly 35 shown in FIG. 4A is installed at the center and energy from the high temperature contaminated gas is transferred to a waterway disposed at an upper portion through a heat pipe 36 disposed at the center of the inertial impact type energy recovery and dust removal assembly. Therefore, cold water that is supplied to the waterway disposed at the upper portion is converted into hot water, such that the hot water is discharged.

In addition, an inertial impact phenomenon is generated in each blade of the inertial impact type energy recovery and dust removal assembly 35, such that the coarse dust included in the high temperature contaminated gas is removed.

Figure 4C:
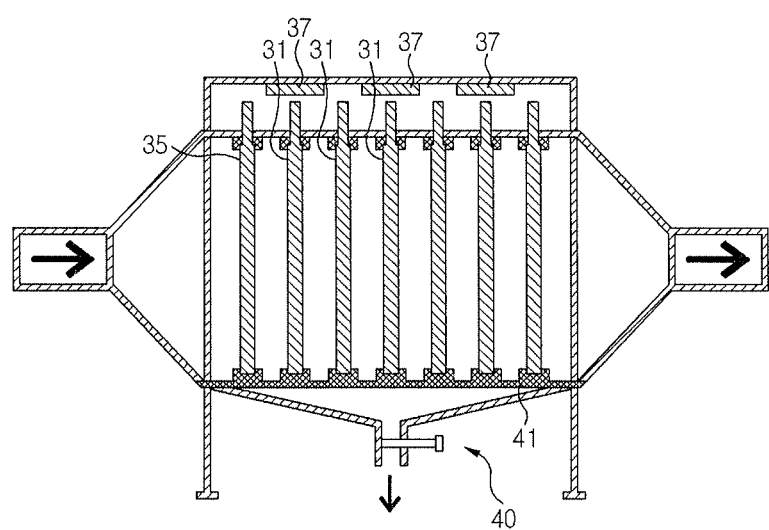
FIG. 4C shows an energy recovery and inertial impact type dust removal unit in which the air cooling off system is applied.

FIG. 4C shows an example in which the air-cooling system is applied. In case the heat transmitted from the heat pipe 31 does not need to be used and the freeze and burst is available, the fan 37 is installed in the upper portion as shown in the FIG. 4C. Accordingly, the heat pipe 31 is heated by the contaminated air, and the fan operates to cool the heat pipe 31.

Figure 5:
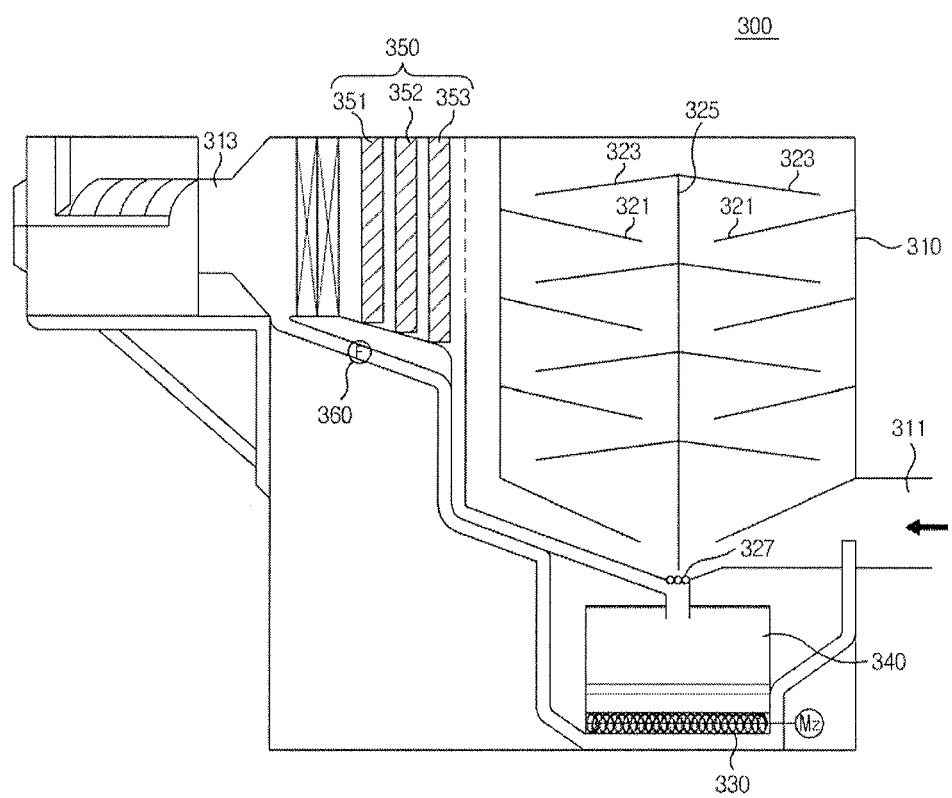
FIG. 5 is a diagram showing a first embodiment of a chamber used in an in-flight adsorption apparatus in the energy recycling type dust removing processing system for removing a contaminated material in high temperature contaminated gas according to the exemplary embodiment of the present document.

FIG. 5 is a diagram showing a first embodiment of a chamber 300 used in an in-flight adsorption apparatus in the energy recycling type dust removing processing system for removing a contaminated material in high temperature contaminated gas according to the exemplary embodiment of the present document.

As shown in FIG. 5, first partition walls 321 extended from sidewalls and second partition walls extended from a central column 352 are alternately installed in a housing 310 to form a zigzag channel. This channel is connected to a first duct 311 and a second duct 313, such that exhaust gas introduced from the first duct 311 forms a zigzag air current along the channel. As shown in FIG. 5, the first and second partition walls 321 and 323 are installed so as to be inclined at a downward acute angle with respect to a horizontal direction of the housing 310, such that contaminated dust in which the contaminated material described above may fall down by gravity.

Meanwhile, a bottom surface of the housing 310 is provided with an adsorbent discharging unit 330. The adsorbent discharging unit 330 is an apparatus for discharging an adsorbent adsorbing exhaust gas to the zigzag channel and simultaneously generating an impact effect to coarsen fine dust. As the adsorbent, activated carbon or zeolite may be used. When this adsorbent is introduced into the zigzag channel formed by the partition walls 321 and 323, it flows together with the exhaust gas along an air current of the exhaust gas in the zigzag channel and collects the contaminated material (gas and fine dust) included in the exhaust gas. When the contaminated dust becomes sufficiently heavy (that is, when the fine dust is coarsened), it falls on planes of the partition walls. The dust falling as described above descends toward the bottom surface of the housing 310 due to the gravity, and is collected in a contaminated dust receiving part 340 through an outlet 327. In addition, the contaminated dust still present on the planes of the partition walls may fall to the contaminated dust receiving part 340 through an impact apparatus 380.

Meanwhile, an inertial impact apparatus 350 having a secondary cleaning function may be configured to have three sub-filters. The fine dust of the primarily cleaned air is removed through the inertial impact apparatus 350, such that further cleaned air may be discharged to the second duct 313.

In addition, the chamber 300 may further include an inducing fan 360 that is installed to direct a portion of an air current discharged from the second duct 313 to the adsorbent discharging unit 330. Therefore, the adsorbent may be easily introduced into the zigzag channel.

Next, shapes of the partition walls used to form the zigzag channel will be described in more detail with reference to FIG. 6.

Figure 6:
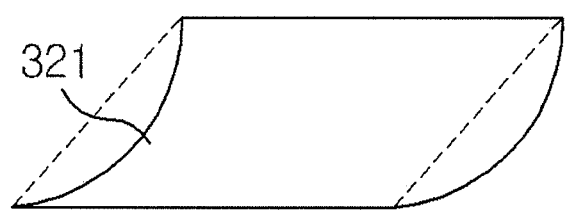
FIG. 6 is a perspective view of a partition wall used in the first embodiment of the chamber.

FIG. 6 is a perspective view of a partition wall used in the first embodiment of the chamber. As shown in FIG. 6, a partition wall module used for the first and second partition walls 321 and 323 generally has a square shape and an arcuate cross section. The partition wall module has a shape similar to that of a traditional kite. The partition wall module is formed as described above, such that the falling contaminated dust may descend.

Next, the impact apparatus will be schematically described with reference to FIGS. 7 and 8.

Figure 7:
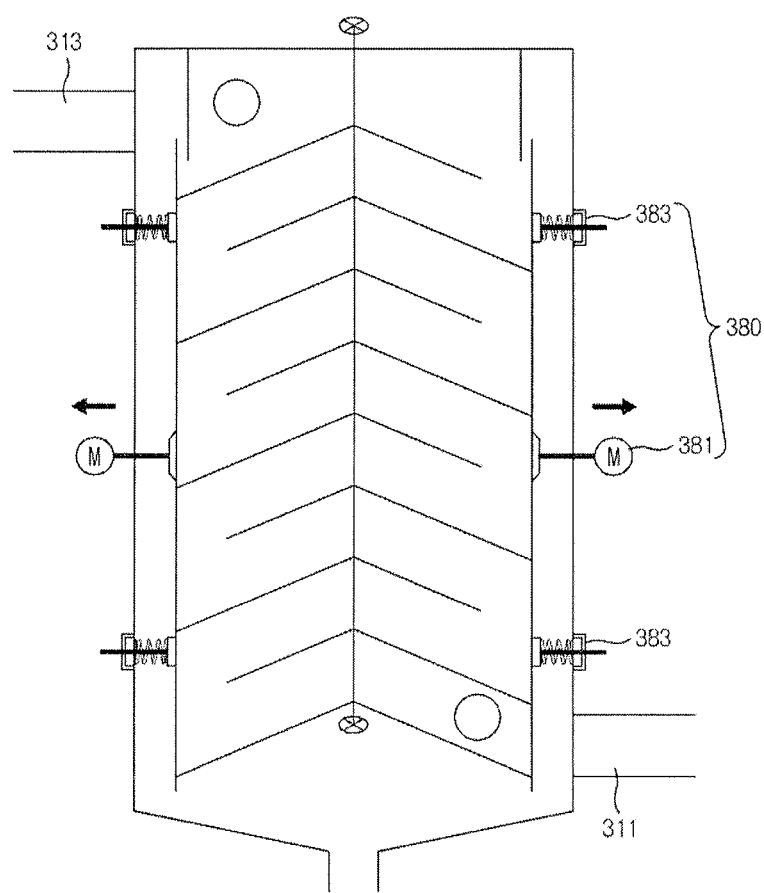
FIG. 7 is a diagram describing an example of an impact apparatus used in the first embodiment of the chamber.
Figure 8:
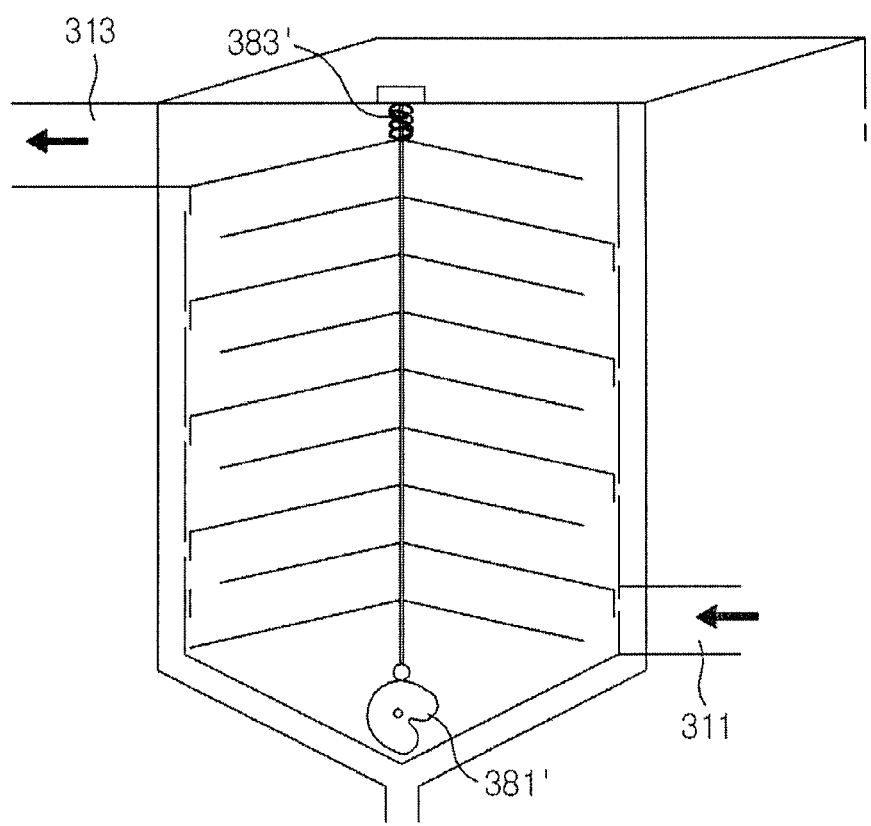
FIG. 8 is a diagram describing another example of an impact apparatus used in the first embodiment of the chamber.

FIG. 7 is a diagram describing an example of an impact apparatus used in the first embodiment of the chamber; and FIG. 8 is a diagram describing another example of an impact apparatus used in the first embodiment of the chamber. The impact apparatus 380 is an apparatus that applies an impact to the housing 310 in order to remove the contaminated material collected on the planes of the partition walls. According to the example shown in FIG. 7, motors 381 for applying the impact are installed at both sides of the housing 310 and buffering parts 383 are installed at upper and lower ends of the housing 310. In addition, according to another example shown in FIG. 8, in the impact apparatus 380, an impact weight 381' is disposed at a central lower portion and a buffering part 383', for buffering impact in the case that the impact is applied to the housing 310 by the impact weight 381', is installed at a ceiling part of the housing 310 on the same line as the impact weight 381'.

The chamber according to the exemplary embodiment of the present document includes the impact apparatus as described above, such that the contaminated dust adsorbed with the contaminated material of the exhaust gas is not present on the partition walls, but is collected downwardly. Therefore, maintenance may be easily made.

Next, a second embodiment of the chamber according to the exemplary embodiment of the present document will be described with reference to FIG. 9. A description of portions of the second embodiment of the chamber that are the same as those of the first embodiment of the chamber described above will be omitted for simplification.

Figure 9:
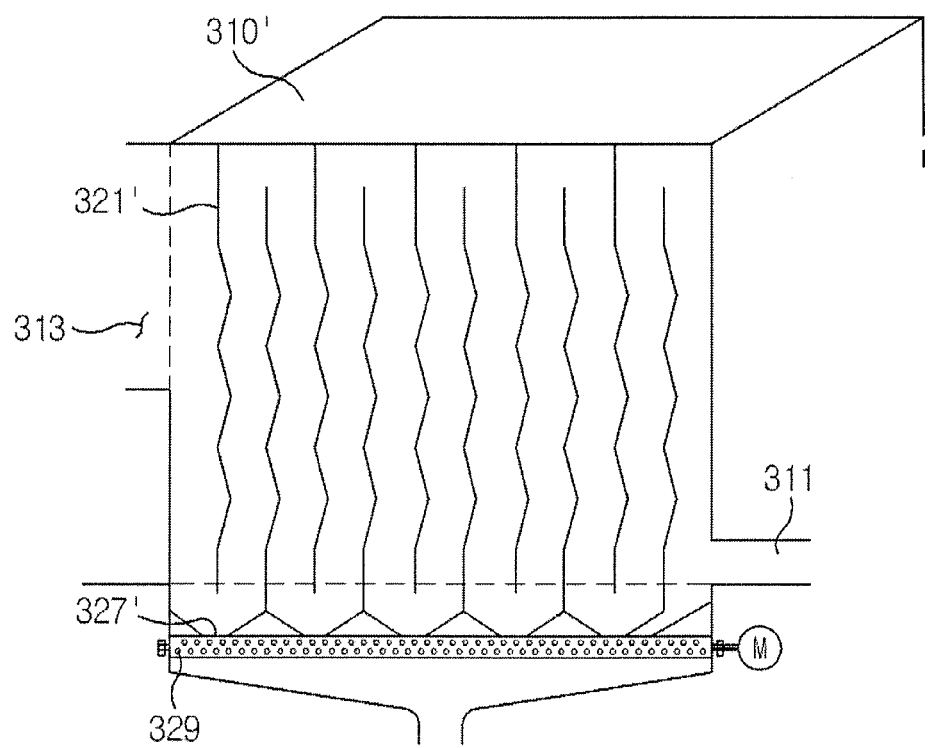
FIG. 9 is a cross-sectional view of a second embodiment of the chamber according to the exemplary embodiment of the present document.

FIG. 9 is a cross-sectional view of the second embodiment of the chamber. As shown in FIG. 9, in the second embodiment of the chamber 300 according to the exemplary embodiment of the present document, the plurality of partition walls 321' are attached to either the bottom surface or the ceiling surface of the housing 310' to form a zigzag channel, such that a vertical type zigzag channel is formed unlike the first embodiment of the chamber described above. In addition, one end of the vertical type zigzag channel formed by the plurality of partition walls 321' is installed with a porous roller 329. The porous roller 329 serves to prevent air current from being divided in the contaminated dust receiving part 340 to allow the adsorbent to better adsorb the contaminated dust and transfer the heavy contaminated dust to the contaminated dust receiving part 340, simultaneously with serving to transmit the contaminated dust to the contaminated dust receiving part 340.

According to a configuration of the second embodiment of the chamber 300, the contaminated dust is not collected on the planes of the partition walls.

According to the exemplary embodiment of the present document having the above-mentioned configuration, the dust, which is a particulate air contaminated material in high temperature exhaust gas such as exhaust gas of a kiln for charcoal production and a charcoal kiln for fomentation, exhaust gas of a meat roasting restaurant, oil vapor generated in a drying process of a food processing factory, or the like, may be cleaned, and energy is recovered and recycled from the high temperature exhaust gas, thereby making it possible to improve energy efficiency.

In addition, according to the exemplary embodiment of the present document, coarse dust such as oil droplets, or the like, is first removed through the inertial impact type dust removal apparatus, such that there is an advantage in view of maintenance in that a dust collecting load of a subsequent micro dust removal apparatus is minimized and the durability of the entire system may be increased.

Further, the channel of the chamber in the in-flight adsorption apparatus is formed in the zigzag shape to secure a residence time in which the contaminated material may be adsorbed to the adsorbent, thereby making it possible to improve the efficiency of removing particulate matter and gaseous air contaminated materials.

According to the energy recycling type dust removing processing system for removing a contaminated material in high temperature contaminated gas and the inertial impact type energy recovery and dust removal apparatus as described, the configuration and the method of the exemplary embodiments described above are not restrictively applied, but all or some of the respective exemplary embodiments may be combined with each other so that the exemplary embodiments may be various modified.

What is claimed is:

1. An energy recycling type dust removing processing system for removing a contaminated material in high temperature contaminated gas, the energy recycling type dust removing processing system comprising:

a collection duct for collecting a high temperature contaminated gas including a high temperature dust;

an energy recovery and inertial impact type dust removal unit for recovering energy from the high temperature contaminated gas and converting the high temperature contaminated gas into a middle-low temperature contaminated gas and removing a coarse dust in the high temperature dust through an inertial impact phenomenon;

an in-flight adsorption apparatus for removing fine dust from the middle-low temperature contaminated gas in which the coarse dust is removed;

a micro dust removal apparatus for removing micro dust in contaminated air from which the fine dust is removed by the in-flight adsorption apparatus; wherein the energy recovery and inertial impact type dust removal unit includes:

a first blade being inclined, by a predetermined angle, with respect to a flow of the high temherature contaminated gas and thereby inclined, by predetermined angle, with respect to a direction of the flow of the high temperature contaminated gas;

a second blade extending from the first blade and having a bending angle;

heat pipe located at a connection point of the first and the second blades, and the high temperature contaminated gas passing around the heat pipe for converting cold water into hot water;

a pair of arcuate cross sectional shaped first blocking blades installed on the heat pipe; and an arcuate cross sectional shaped second blocking blade installed on a rear end portion of the second blade.

2. The energy recycling type dust removing processing system of claim 1, wherein the micro dust removal apparatus includes at least one of a middle performance high temperature type adsorption filter, an electrostatic precipitator (ESP), a bag filter dust collector, and an electrostatic cyclone.

3. The energy recycling type dust removing processing system of claim 1, further comprising an energy recycling system for recycling energy obtained from the energy recovery and inertial impact type dust removal unit.

4. The energy recycling type dust removing processing system of claim 3, wherein the energy recycling system includes:

a hot water tank accommodating hot water supplied from the energy recovery and inertial impact type dust removal unit therein; and an auxiliary energy unit for supplying energy to the hot water tank.

5. The energy recycling type dust removing processing system of claim 1, wherein the in-flight adsorption apparatus includes:

a chamber connected to the inertial impact type dust removal apparatus; and a cyclone dust collecting apparatus connected to the chamber.

6. The energy recycling type dust removing processing system of claim 5, wherein the chamber includes:

a housing including a first duct and a second duct;

a plurality of partition walls are inclinedly installed on inner walls of the housing to form a zigzag channel; and an adsorbent discharging unit is installed in the housing to discharge an adsorbent to the channel.

7. The energy recycling type dust removing processing system of claim 6, wherein the first duct is a duct through which the high temperature contaminated gas is introduced and the second duct is a duct for discharging cleaned air from which the high temperature contaminated dust is removed.

8. The energy recycling type dust removing processing system of claim 6, wherein the plurality of partition walls are attached to sidewalls of the housing and are installed to be inclined at a downward acute angle with respect to a horizontal direction.

9. The energy recycling type dust removing processing system of claim 6, wherein the plurality of partition walls have an arcuate cross-section shape.

10. The energy recycling type dust removing processing system of claim 6, wherein the chamber further includes an impact apparatus for applying impact to the housing in order to remove the contaminated material collected on surfaces of the partition walls.

11. The energy recycling type dust removing processing system of claim 10, wherein the impact apparatus includes an eccentric motor.

12. The energy recycling type dust removing processing system of claim 6, wherein the plurality of partition walls are alternately attached to either a bottom surface or a ceiling surface of the housing to form the zigzag channel.

13. The energy recycling type dust removing processing system of claim 1, further comprising a pyroligneous liquor recovering can that is connected to the energy recovery and inertial impact type dust removal unit to condense dry distillation gas generated at the time of producing charcoal, thereby recovering pyroligneous liquor, wherein the dry distillation gas corresponds to the high temperature contaminated gas.

14. The energy recycling type dust removing processing system of claim 1, further comprising an unburned material reburning apparatus, installed at the rear end of the collecting duct, for burning and remove micro dust that is not removed in the micro dust removal apparatus.

15. The energy recycling type dust removing processing system of claim 1, further comprising an open damper for making a flow rate of the contaminated gas supplied to the micro dust removal apparatus constant.

16. The energy recycling type dust removing processing system of claim 15, further comprising a self flow rate for controlling blowing apparatus configured to open the open damper.

17. The energy recycling type dust removing processing system of claim 1, wherein the energy recycling type dust removing processing system comprises a plurality of heat pipes, and each heat pipe is connected with a respective first blade and a respective second blade, and each heat pipe also has a pair of arcuate cross sectional shaped first blocking blades and an arcuate cross sectional shaped second blocking blade.

* * * * *